United States Patent
Saari et al.

(10) Patent No.: US 8,955,397 B2
(45) Date of Patent: Feb. 17, 2015

(54) TEST SYSTEM FOR MEASURING AND EVALUATING DYNAMIC BODY FORCES

(71) Applicant: MTS Systems Corporation, Eden Prairie, MN (US)

(72) Inventors: Byron J. Saari, Minneapolis, MN (US); David M. Fricke, Prior Lake, MN (US)

(73) Assignee: MTS Systems Corporation, Eden Prairie, MN (US)

(*) Notice: Subject to any disclaimer, the term of this patent is extended or adjusted under 35 U.S.C. 154(b) by 0 days.

(21) Appl. No.: 13/655,514

(22) Filed: Oct. 19, 2012

(65) Prior Publication Data
US 2013/0104670 A1 May 2, 2013

Related U.S. Application Data

(60) Provisional application No. 61/549,524, filed on Oct. 20, 2011.

(51) Int. Cl.
*G01L 1/00* (2006.01)
*G01L 5/00* (2006.01)
*G01M 7/02* (2006.01)
*G01M 17/007* (2006.01)

(52) U.S. Cl.
CPC ............. *G01L 5/0052* (2013.01); *G01M 7/022* (2013.01); *G01M 17/007* (2013.01)
USPC .................................................... 73/862.381

(58) Field of Classification Search
CPC ..... G01M 9/04; G01M 13/027; G01M 17/00; G01L 5/00
USPC ................ 73/117.03, 147, 855, 862, 862.381
See application file for complete search history.

(56) References Cited

U.S. PATENT DOCUMENTS

| | | |
|---|---|---|
| 5,003,819 A | 4/1991 | Koopmann |
| 5,111,685 A | 5/1992 | Langer |
| 5,610,330 A | 3/1997 | Fricke |
| 5,942,673 A * | 8/1999 | Horiuchi et al. ............. 73/11.04 |
| 6,457,352 B1 * | 10/2002 | Knestel ..................... 73/117.03 |
| 6,457,369 B1 | 10/2002 | Petersen |

(Continued)

FOREIGN PATENT DOCUMENTS

EP    1746402 A2    1/2007

OTHER PUBLICATIONS

European Search Report and Written Report of the European Patent Office Patent Office in counterpart foreign application No. PCT/US2012/060950 filed Oct. 19, 2012.

*Primary Examiner* — Max Noori
(74) *Attorney, Agent, or Firm* — Steven M. Koehler; Westman, Champlin and Koehler, P.A.

(57) ABSTRACT

A test system configured to impart a body disturbance to a test specimen and measure motion or displacement of the test specimen in response to the input body disturbance. The system includes one or more actuator devices configured to replicate motion or displacement of the body imparted through the original input body disturbance utilizing the measured motion or displacement. As disclosed, the system includes algorithms or instructions to generate control parameters utilizing the measured motion or displacement to control operation of the one or more actuator devices. The force applied through the one or more actuator devices to replicate the measured motion or displacement is used to determine the force or load applied to the body via the input disturbance.

20 Claims, 18 Drawing Sheets

(56) References Cited

U.S. PATENT DOCUMENTS

| | | | |
|---|---|---|---|
| 6,997,049 B2 * | 2/2006 | Lacey, Jr. | 73/147 |
| 7,031,949 B2 | 4/2006 | Lund | |
| 2004/0230394 A1 * | 11/2004 | Saari et al. | 702/113 |
| 2008/0134773 A1 * | 6/2008 | Parison | 73/117.03 |

* cited by examiner

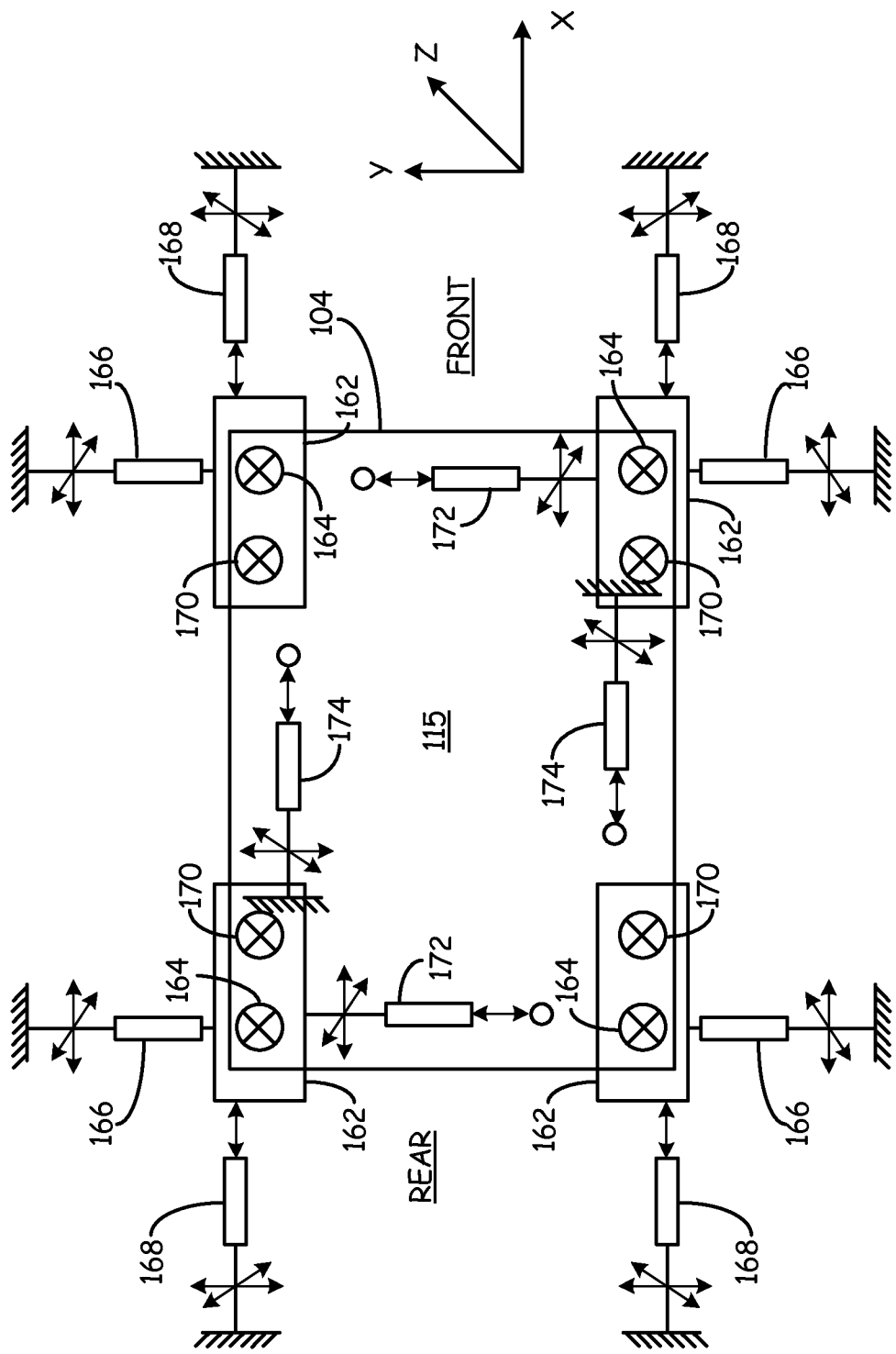

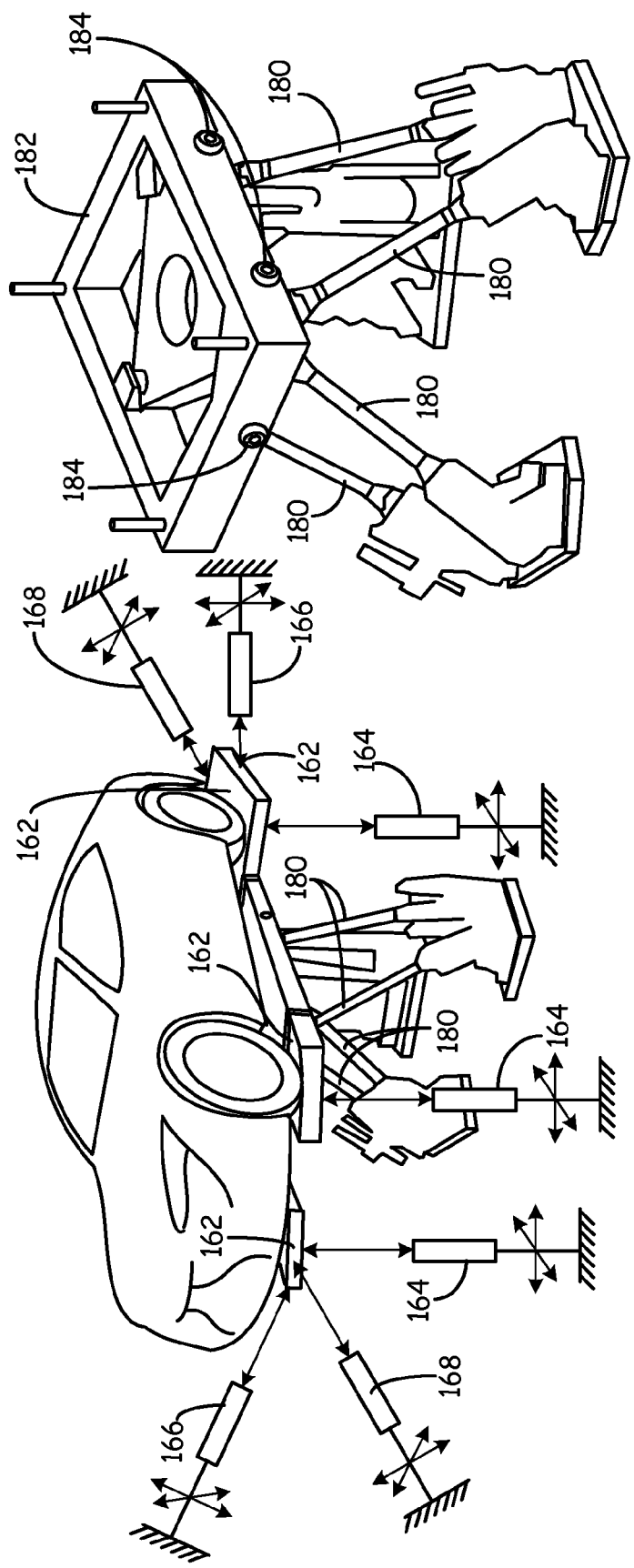

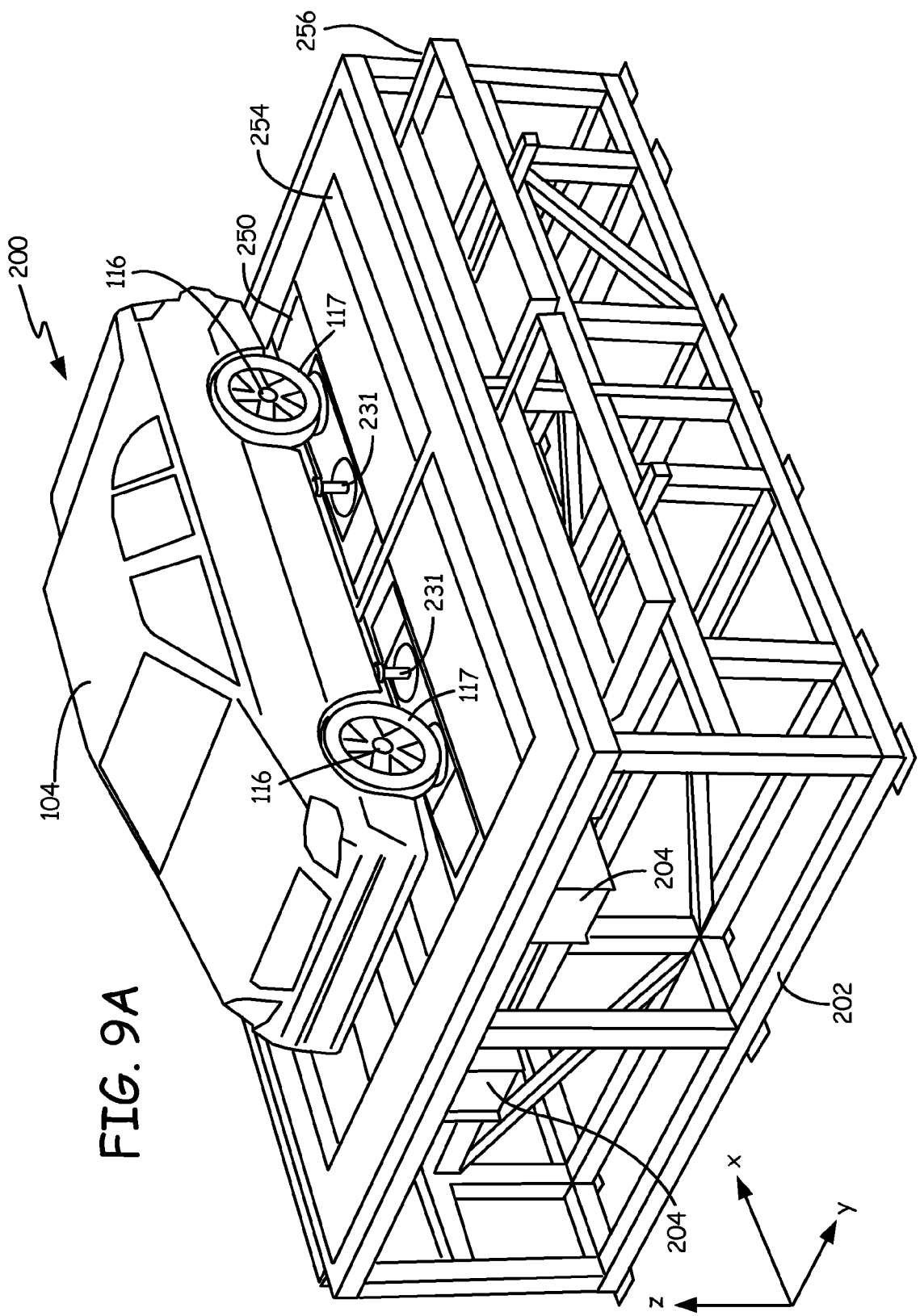

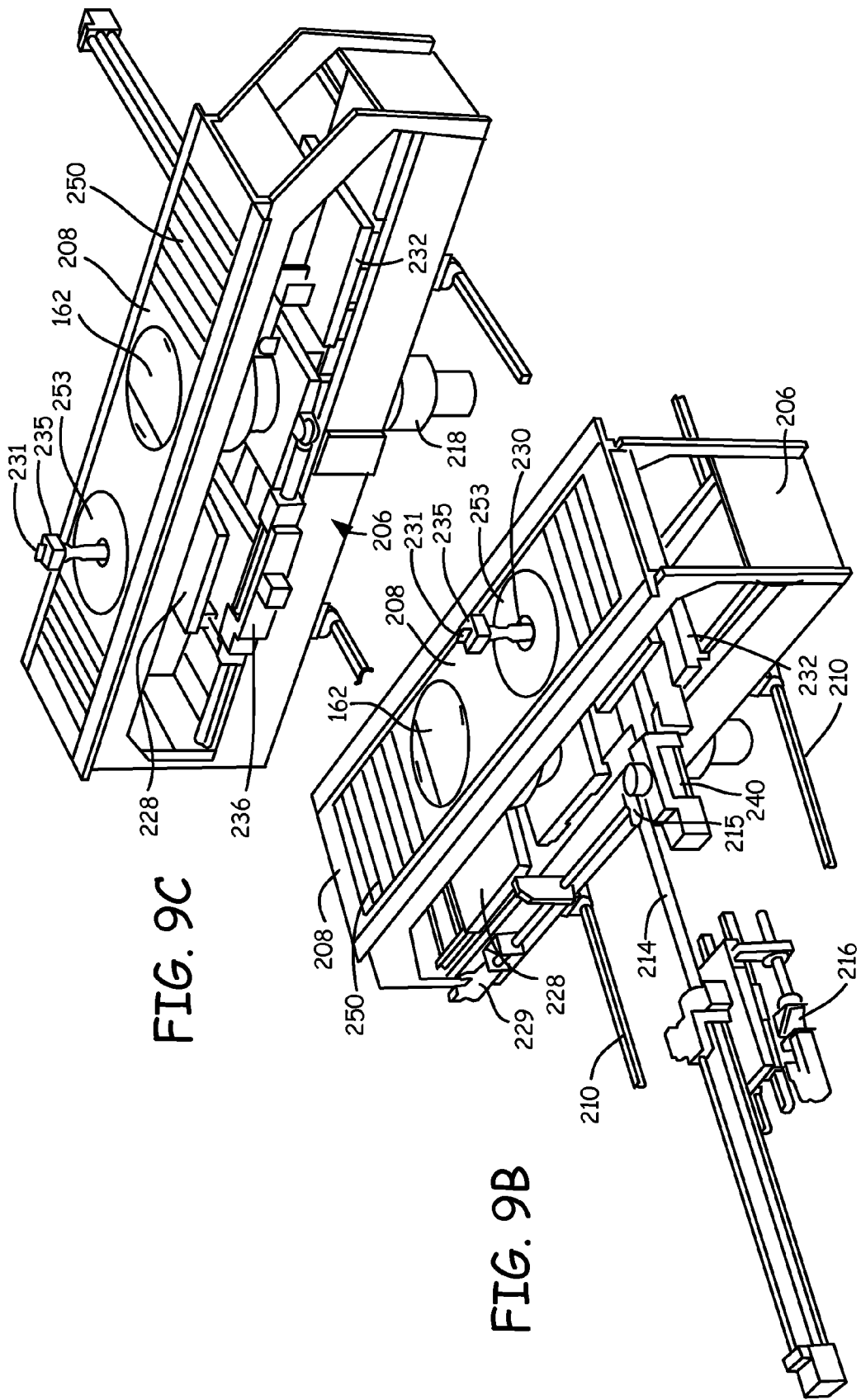

TEST SYSTEM FOR MEASURING AND EVALUATING DYNAMIC BODY FORCES

CROSS-REFERENCE TO RELATED APPLICATION

The present application is based on and claims priority to and the benefit of U.S. Provisional patent application Ser. No. 61/549,524, filed Oct. 20, 2011, the content of which is hereby incorporated by reference in its entirety.

BACKGROUND

Test equipment is used to test performance of a test specimen in response to dynamic forces and motion imparted to the test specimen during various operating conditions. Such test equipment utilizes various actuators and devices to input force to the specimen. Typically, for a vehicle test apparatus input force or motion corresponds to road or steer input imparted to the vehicle through the vehicle suspension. Various other forces such as aerodynamic forces act on the vehicle during operation. Unlike road and steer forces, it is difficult to measure and quantify aerodynamic forces on the body imparted during operation of the vehicle.

SUMMARY

The present application describes a test system or apparatus to evaluate and measure forces that can be considered to be equivalent to various aerodynamic or other force disturbances imparted to a body through paths other than the vehicle suspension. The test system is configured to impart a disturbance to a test specimen and measure body motion or displacement imparted to the test specimen in response to the input disturbance. The system includes one or more actuator devices configured to replicate the motion or displacement of the body disturbance utilizing the measured motion or displacement. As disclosed, the system includes algorithms or instructions to generate control parameters utilizing the measured motion or displacement to control operation of the one or more actuator devices. In the absence of the force disturbance, the force applied through the one or more actuator devices to replicate the measured motion or displacement is used to determine the force or load applied to the body by the original input force disturbance. The test system described can be implemented using different body motion control systems to replicate the measured motion and displacement and the above summary should not limit the scope of Applicant's invention nor restrict application to particular embodiments disclosed herein.

BRIEF DESCRIPTION OF THE DRAWINGS

FIGS. 7A-7B schematically illustrate another embodiment of a test rig for implementing the test systems or procedures illustrated in FIGS. 2-5.

FIGS. 8A-8B schematically illustrate another embodiment of a test rig for implementing the test systems or procedures illustrated in FIGS. 2-5.

FIGS. 9A-9E schematically illustrate another embodiment of a test rig for implementing the test systems or procedures illustrated in FIGS. 2-5.

DETAILED DESCRIPTION OF ILLUSTRATIVE EMBODIMENTS

Figure 1:
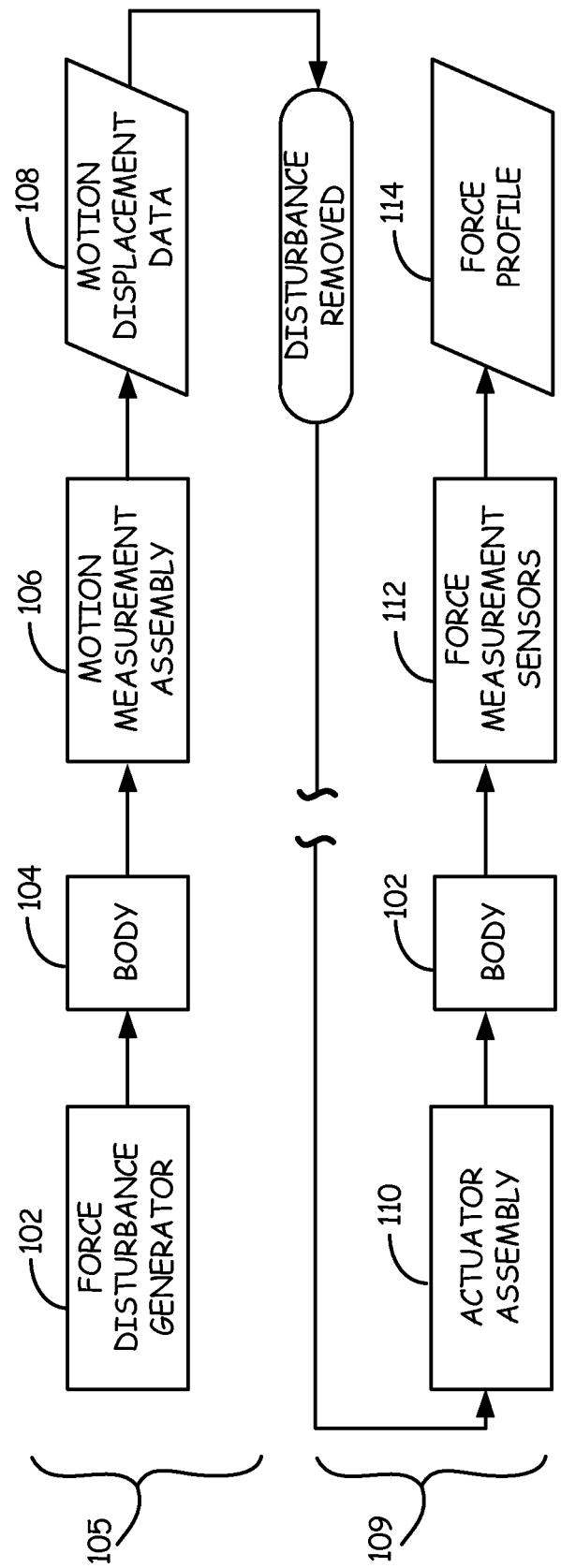
FIG. 1 schematically illustrates an embodiment of a test system for determining forces acting on a body from a force disturbance generator such as a wind tunnel.

This application discloses embodiments of a test system and method, which is used for measuring a magnitude and direction of forces acting on a body via an input force disturbance, or wind force generated for example, by a wind tunnel. FIG. 1 illustrates one embodiment of the test system or assembly, which as shown includes a force disturbance generator 102, which imparts force to a body 104 or a test specimen during a first testing phase 105. Body 104 is typically rigid, but need not be and thus use of the rigid assumption should not be considered limiting. The motion or displacement of the body 104 in response to the force disturbance generator 102 is detected via a motion measurement assembly 106, which outputs motion/displacement data 108 corresponding to the detected motion of the body 104 or portion thereof. The force disturbance is removed during a second test phase 109 and the output displacement data 108 is used to command the actuator assembly 110, which includes one or more actuators, to impart or replicate the motion or force to the body 104 by the force disturbance generator 102.

The one or more actuators are energized to move or displace the body 104 based upon the motion data 108 so that the actuator assemblies recreate the motion or displacement of the body 104 imparted by the force disturbance generator 102. The input force or forces of the actuator assembly 110 are measured by one or more force measurement sensors or transducers 112 to output a force profile 114 to quantify the forces applied to the body 104 by the force disturbance generator 102 during the first phase 105. Illustratively, the force profile would include a magnitude and direction of the forces and moments acting on different portions of the body 104.

Figure 2:
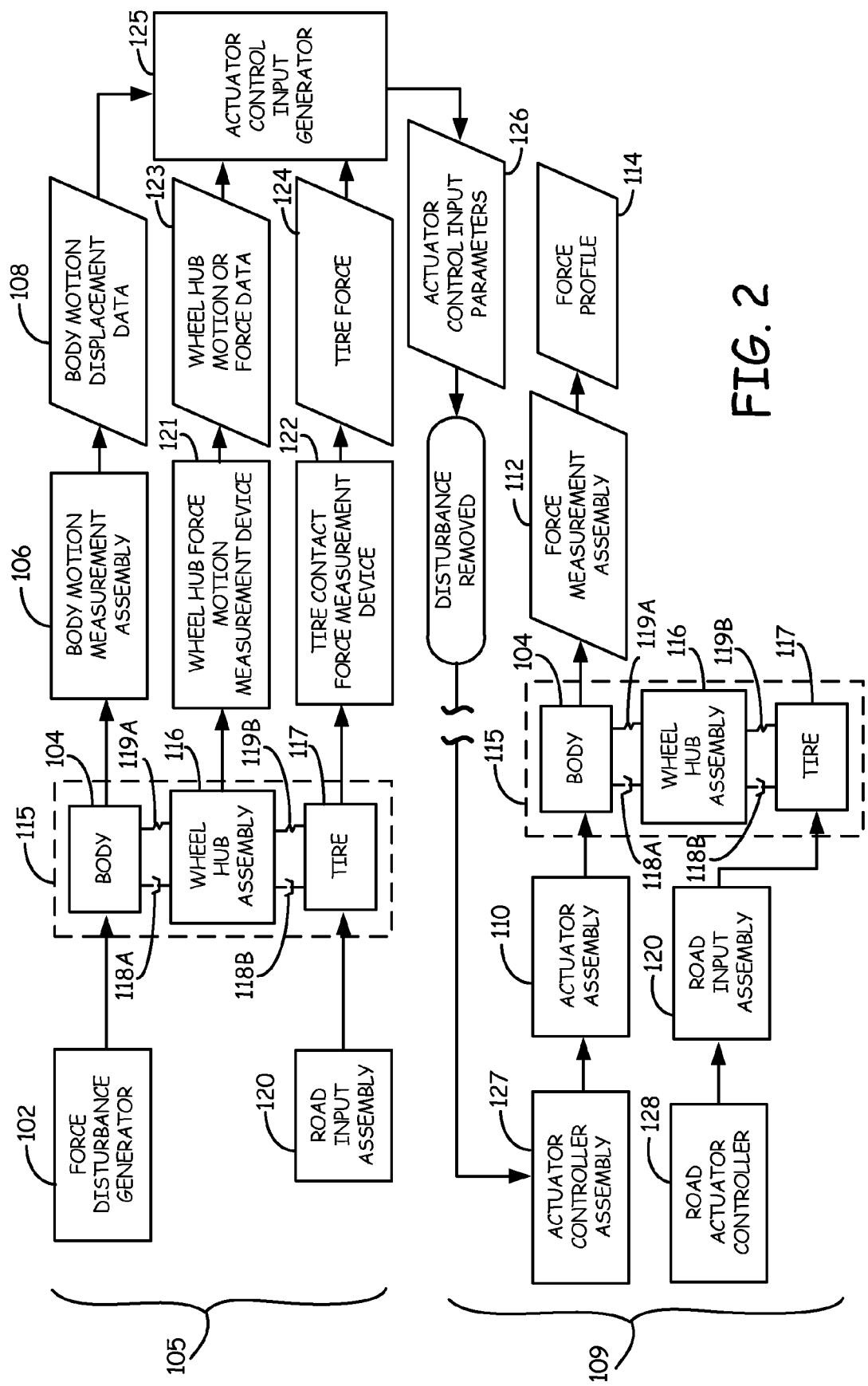
FIG. 2 is a detailed illustration of an embodiment of a test system for determining or evaluating forces acting on a vehicle body.

In an illustrative embodiment, the test system can be used for a vehicle test specimen 115 which includes body 104 coupled to a wheel hub assembly 116 and tire 117 as schematically shown in FIG. 2. Tire 117 is rotationally coupled to the wheel hub assembly 116 and contacts the roadway or test surface (not shown). As schematically represented, the body 104 is coupled to the wheel hub assembly 116 through a suspension having a spring 118A and damping assembly 119A. Similarly, the mechanical interface between the tire 117 and wheel hub assembly 116 provides a spring component 118B and viscous damping component 119B. Force is imparted to the body 104 by the force disturbance generator 102 and the road input assembly 120. Force imparted by the road input assembly 120 is transmitted through the tire 117 and wheel hub assembly 116 to the body 104 as shown.

In the embodiment illustrated in FIG. 2, during the first test phase 105, the force disturbance generator 102 imparts force to the body 104 and the road input assembly 120 imparts loads to the body 104 through the wheel hub 116 or tire 117 as shown. As previously described with respect to FIG. 1, a body motion measurement assembly 106 measures displacement of the body 104 and outputs motion/displacement data 108 corresponding to the detected motion of the body 104 (or portions thereof). In the illustrated embodiment, the system also includes a wheel hub motion or force measurement assembly 121 and a tire contact force measurement device 122 which outputs wheel hub motion or force data 123 and tire force data 124. Illustratively wheel hub motion is measured by an accelerometer and force is measured by a force transducer or load cell. The output displacement data 108, and wheel hub motion data 123 and/or tire force data 124 are used by an actuator control generator 125 to generate control parameters 126 to command the actuator assembly 110 to move or displace the body 104 to replicate the measured motion or disturbance imparted by the force disturbance generator 102 in the second phase 109.

As shown, the control parameters 126 are provided to controller assembly 127 to provide control inputs to the actuator assembly 110 to replicate the applied forces during the first test phase 105. Simultaneously, the road input is imparted to the tire 117 and wheel hub assembly 116 via the road input assembly under control of a road controller 128. As shown in the second test phase 109, The input force or forces applied to the body 104 by the actuator assembly 110 are measured by the one or more force measurement sensors 112 or techniques to output the force profile 114 in phase two 109 as previously described.

Figure 3:
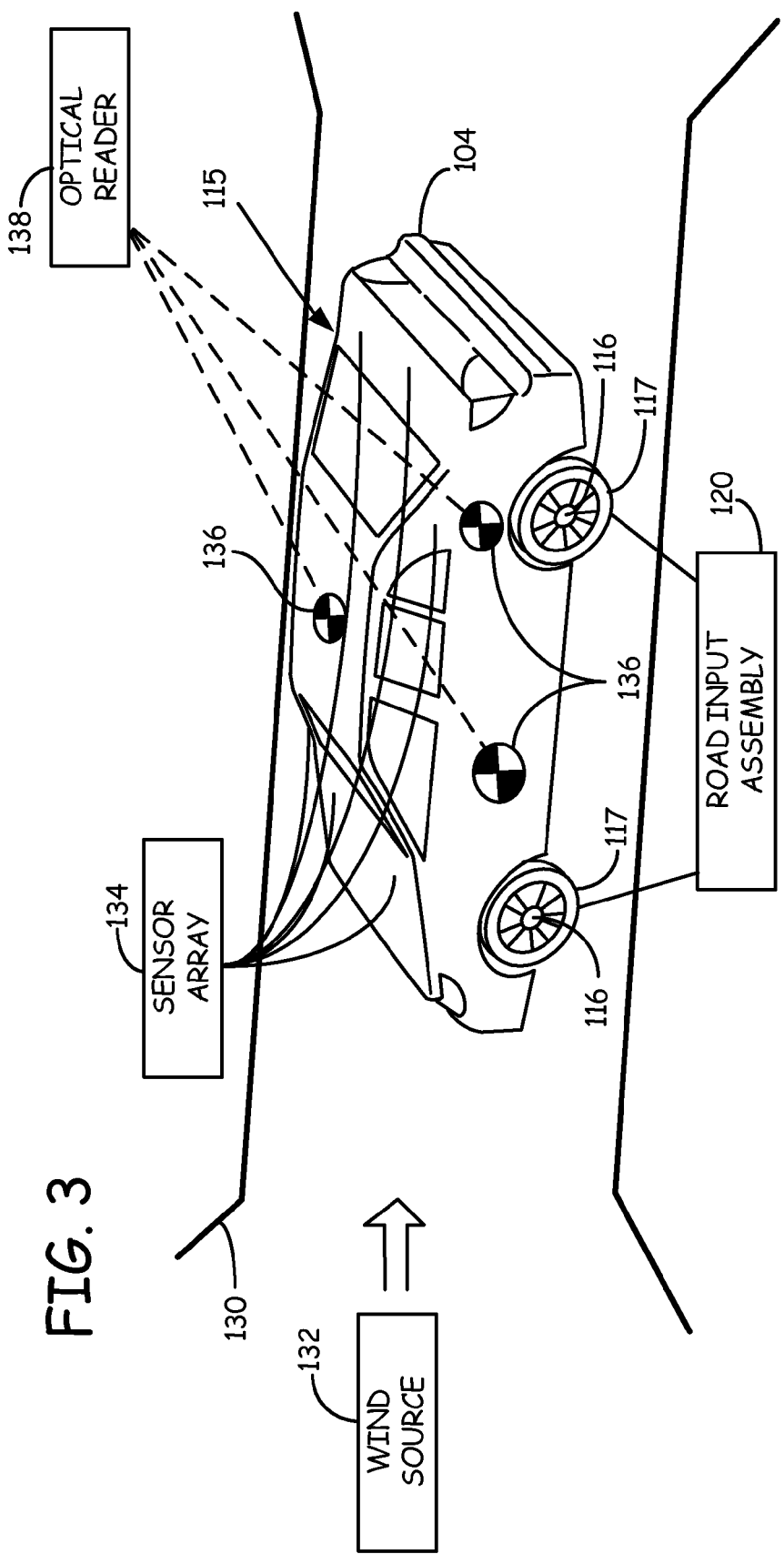
FIG. 3 schematically illustrates components of the test system illustrated in FIG. 1 and FIG. 2.

In the test system shown in FIG. 3, the force disturbance generator 102 is a wind tunnel 130, which applies a wind force from a wind source 132 simultaneously with road inputs from the road input assembly 120. As previously described, the assembly includes a motion measurement assembly 106. In the embodiment shown in FIG. 3, the motion measurement assembly 106 includes a sensor array 134. The sensor array 134 includes a plurality of sensors positioned relative to different locations on the body 104 of the vehicle 115. Illustratively, the sensors of the sensor array 134 include optical sensors, lasers, charged coupled measurement devices (CCD), displacement sensors such as linear variable differential transformer LVDT or string pot transducers. In the illustrated embodiment, sensors are optical targets 136 placed on the body 104 and detected by an optical reader 138. The motion can also be measured with accelerometers instead of measurement of direct displacement and application is not limited to a particular motion sensor or a particular combination of sensors.

Output from the sensor array 134 is used to generate the output motion/displacement data 108. The motion/displacement data 108 is used as reference command for actuators of assembly 110 to replicate the motion of the body 104 measured by the sensor array 134. The force applied by the actuators of assembly 110 is measured via the force measurement sensors 112 shown in FIG. 2 to quantify the forces acting on the body 104 through the force disturbance generator 102. Illustratively, the force measurement sensors 112 include load cells or other transducer devices to measure force applied via each of the actuators of the actuator assembly 110. Alternatively, pressure transducers can be used to measure load applied in a hydraulic or pneumatic actuation assembly 110. In illustrated embodiments, force is measured directly at the actuation point or body attachment to reduce inertial errors in force measurement or such errors can be compensated with acceleration compensation. The measured forces are transformed to any point on the body 104 via coordinate transformation.

Figure 4:
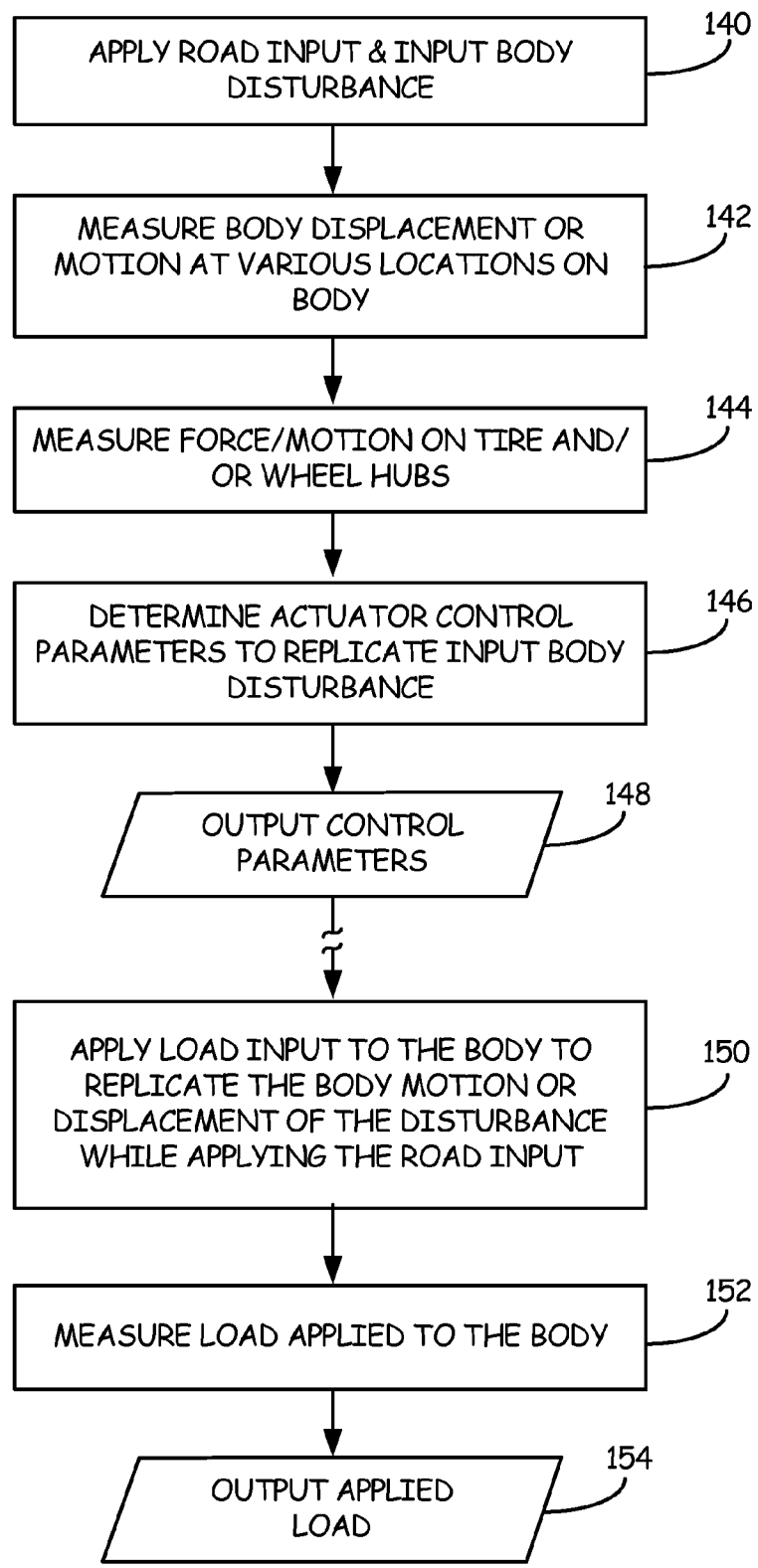
FIG. 4 is a flow chart illustrating an embodiment of a test procedure for determining forces acting on a body according to the system illustrated in FIG. 2.

FIG. 4 is a flow chart illustrating steps for determining forces acting on body 104 for the embodiments illustrated in FIGS. 2-3. During phase one 105, road input is applied to the vehicle while applying body force disturbance as shown in step 140. Illustratively, the road input is applied via one or more actuators of the road input assembly 120 and body force disturbance is supplied via the wind source 132 (e.g. fan) in the wind tunnel 130 (i.e. force of the wind acting on the body 104). As illustrated in step 142, the body motion or displacement 108 is measured at various locations on the body via sensors 136. In step 144, the tire contact force 124 and wheel hub motion or force 123 is measured. The measured body motion or displacement, tire contact force and wheel hub motion or force is used in step 146 to determine the input disturbance on the body 104 and output control parameters in step 148 to replicate the effect of the input body disturbance measured in test phase one 105 in test phase two 109.

During test phase two 109, the wind source 132 is turned off and forces are applied to the body 104 in step 150 via actuator assembly 110 while applying load input through the road input assembly 120. Load is applied to the body 104 at various locations to replicate the displacement of the body 104 measured in step 142 and tire contact force 124 and/or wheel hub motion or force 123 as measured in step 144. Thereafter in step 152, the force or load applied by each of the actuators is measured via the force measurement sensors 112. In step 154, the estimated load or force profile 114 imparted by the force disturbance generator 102 is outputted. As described, the measured load or forces 114 are equivalent or similar to the motion or aerodynamic forces generated by the wind source 132 acting on the body 104.

Figure 5:
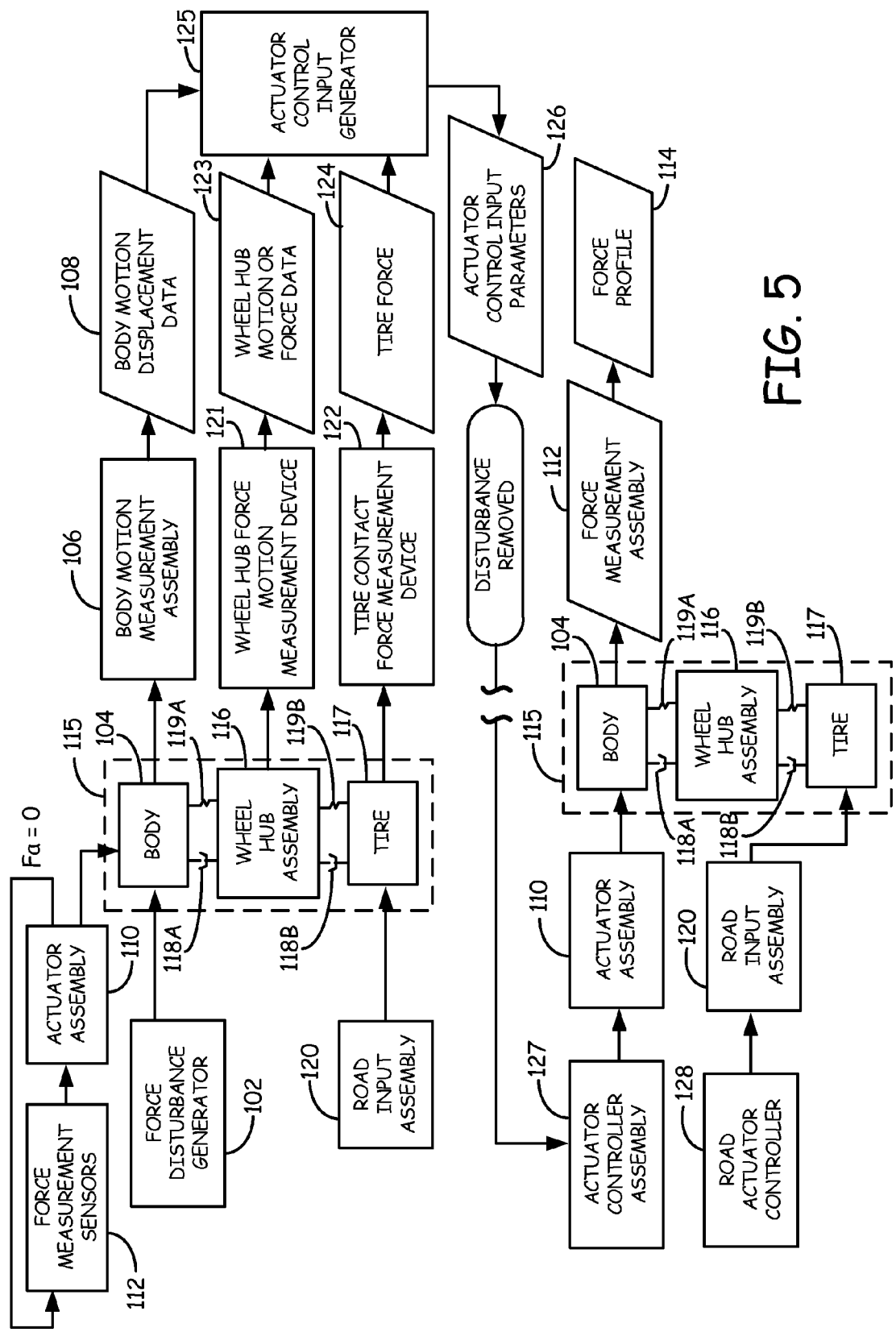
FIG. 5 schematically illustrates another embodiment of a test system for determining forces acting on a body from a force disturbance generator such as a wind tunnel.

FIG. 5 illustrates another embodiment of a test system or assembly, which is used to determine forces acting on a body 104 as previously described with respect to FIG. 2. In previous embodiments, the actuator assembly 110 is detached from the body 104 during phase one 105 so that the actuator assembly 110 does not impart force to the body in addition to the forces imparted by the force disturbance generator 102 and road input assembly 120 shown in FIG. 2. In the embodiment illustrated in FIG. 5, the actuator assembly 110 is attached to the body during phase one 105 but is controlled to apply zero force input. As shown in FIG. 5, during phase one 105, the force disturbance generator 102 imparts force to body 104 and the actuator assembly 110 is controlled to impart zero force to the body 104 based upon feedback from the force measurement sensors 112 or transducer. As previously described, the motion displacement data 108 is measured in phase one 105 is used to command the actuator assembly 110 in phase two 109 to replicate the motion of the body 104. The input force applied to the body 104 by the actuator assembly 110 to replicate the motion of the body is measured to determine the forces acting on the body by the force disturbance generator 102.

Figure 6A:
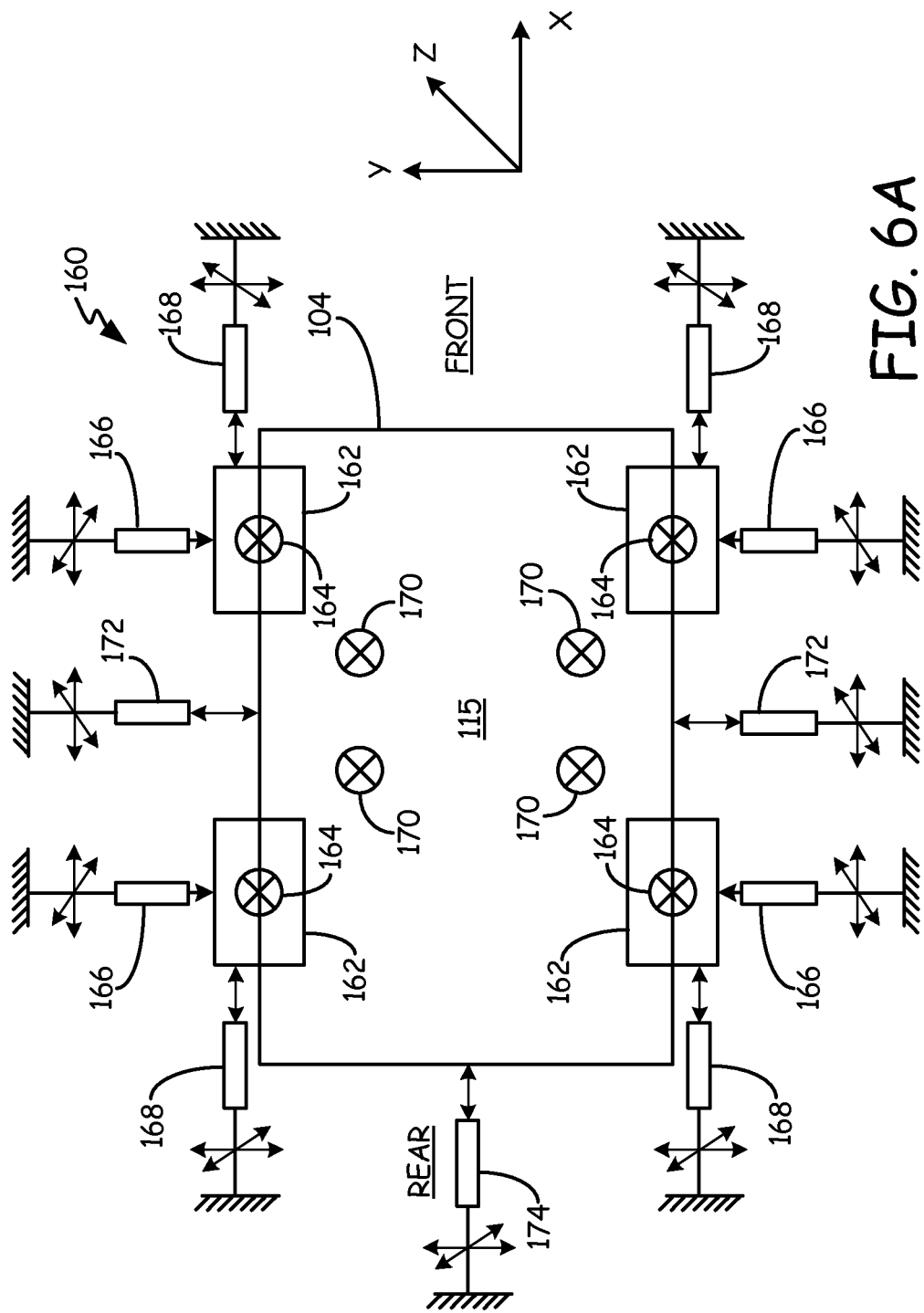
FIGS. 6A-6B schematically illustrate an embodiment of a test rig for implementing the test systems or procedures illustrated in FIGS. 2-5.
Figure 6B:
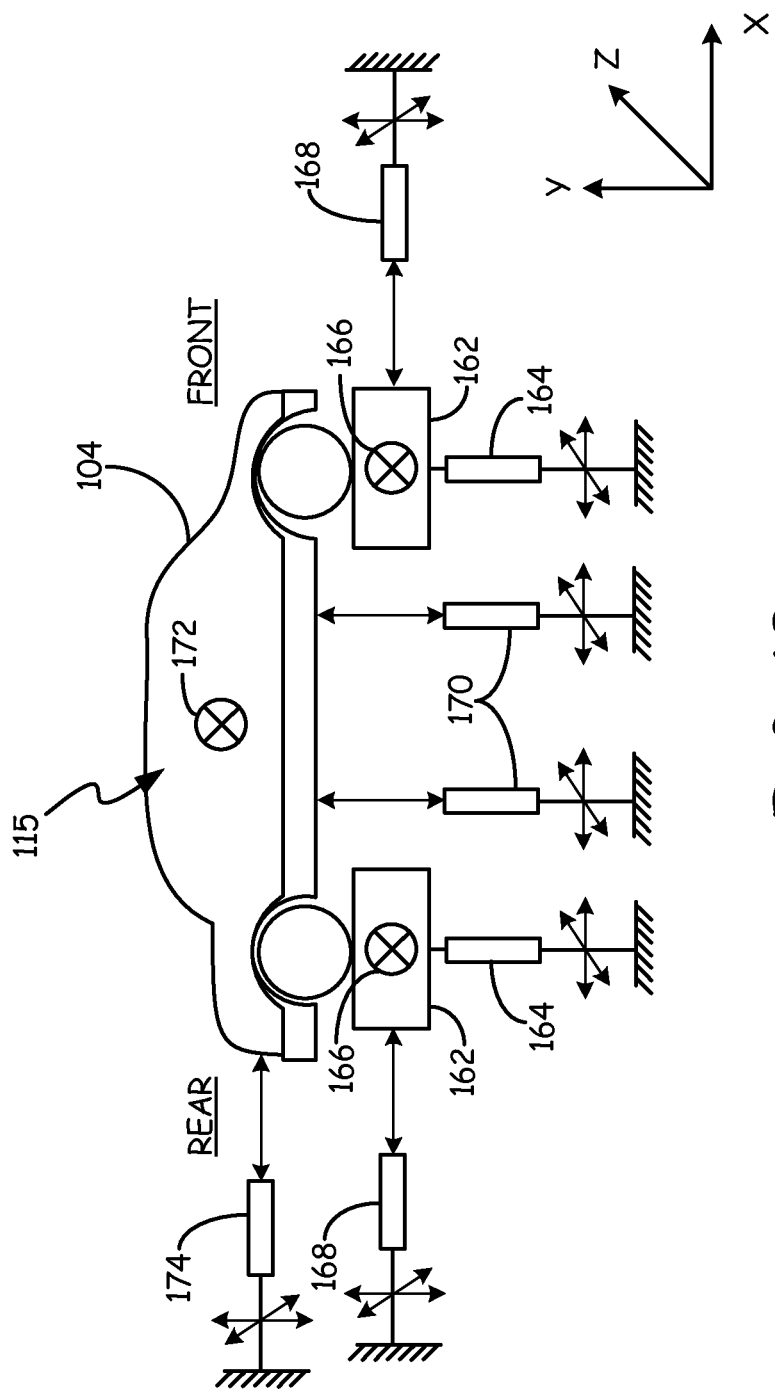

FIGS. 6A-6B illustrate an exemplary embodiment of a test rig configured to implement embodiments of test systems shown in FIGS. 2-5. FIG. 6A is a top schematic view of the test rig and FIG. 6B is a side view. In the embodiment illustrated in FIGS. 6A-6B, the test rig includes road input supports or platforms 162 to support each of the front and rear tires, wheel hubs or spindles. The wheel hubs, tires or spindles are secured to the road input supports or platforms for vehicle testing through straps (not shown) or other connections. Actuators are coupled to the supports or platform 162 to form the road input assembly 120 to apply road inputs to the vehicle 115 through the tire or wheel hub or spindle. In the illustrated embodiment, the actuators of assembly 120 includes a plurality of vertical actuators 164 which can be stationary or movably coupled to the ground at one end and the road input supports or platform 162 at another end to provide load inputs $F_z$ and roll $M_x$ or pitch input $M_y$ to the vehicle 115 through the tires 117 or wheel hubs 116. Pitch and roll are imparted through coordinated operation of the plurality of vertical actuators 164.

Road input assembly 120 also include a plurality of traverse actuators 166 having one end connected to the road input supports or platforms 162 and another end movably coupled or held stationary to the ground or frame of the test rig to provide load input $F_y$ or yaw input $M_z$ and a plurality of longitudinal actuators 168 connected to the supports or platform 162 and held stationary or movably coupled to the frame of the test rig to provide a load input $F_x$ along the x axis. Each of the actuators 164, 166, 168 can be movably coupled to the frame or ground and road input supports or platforms 162 in axes orthogonal to the direction of the input force as schematically shown to accommodate for motion of the road input supports or platform with respect to six degrees of freedom via operation of actuators 164, 166, 168 as is known in the art. Illustratively, actuators 164, 166, 168 are movably coupled to the frame or platforms 162 via slideable platforms and/or through bearing assemblies (not shown) to accommodate for motion of the actuators 164, 166, 168 to apply input loads in 6 DOF.

The test rig also includes a plurality of actuators to form the actuator assembly 110 for applying input load to the body 104 as previously described. As shown, the actuator assembly 110 include a plurality of vertical actuators 170 coupled to the body through an attachment or support at one end and held stationary or movably coupled to the frame or ground at the other end to input input $F_z$ and roll $M_x$ or pitch $M_y$ input to the body 170. The actuator assembly 110 also include a plurality of traverse actuators 172 having one end connected to the body 104 and another end held stationary or movably coupled to the test rig to input a load Fy or yaw input and one or more longitudinal actuators 174 connected to the body and stationary held or movably coupled to frame or ground to provide a load input $F_x$ along the x axis. As previously described, each of the actuators 170, 172, 174 are movably coupled to the test rig and body as schematically shown to accommodate for motion with respect to six degrees of freedom via operation of actuators 170, 172, 174. In the illustrated embodiment, road input forces and input forces to the body replicating the disturbance force are applied in parallel with both forces being applied separately with reference to ground or a fixed frame structure.

Figure 7B:
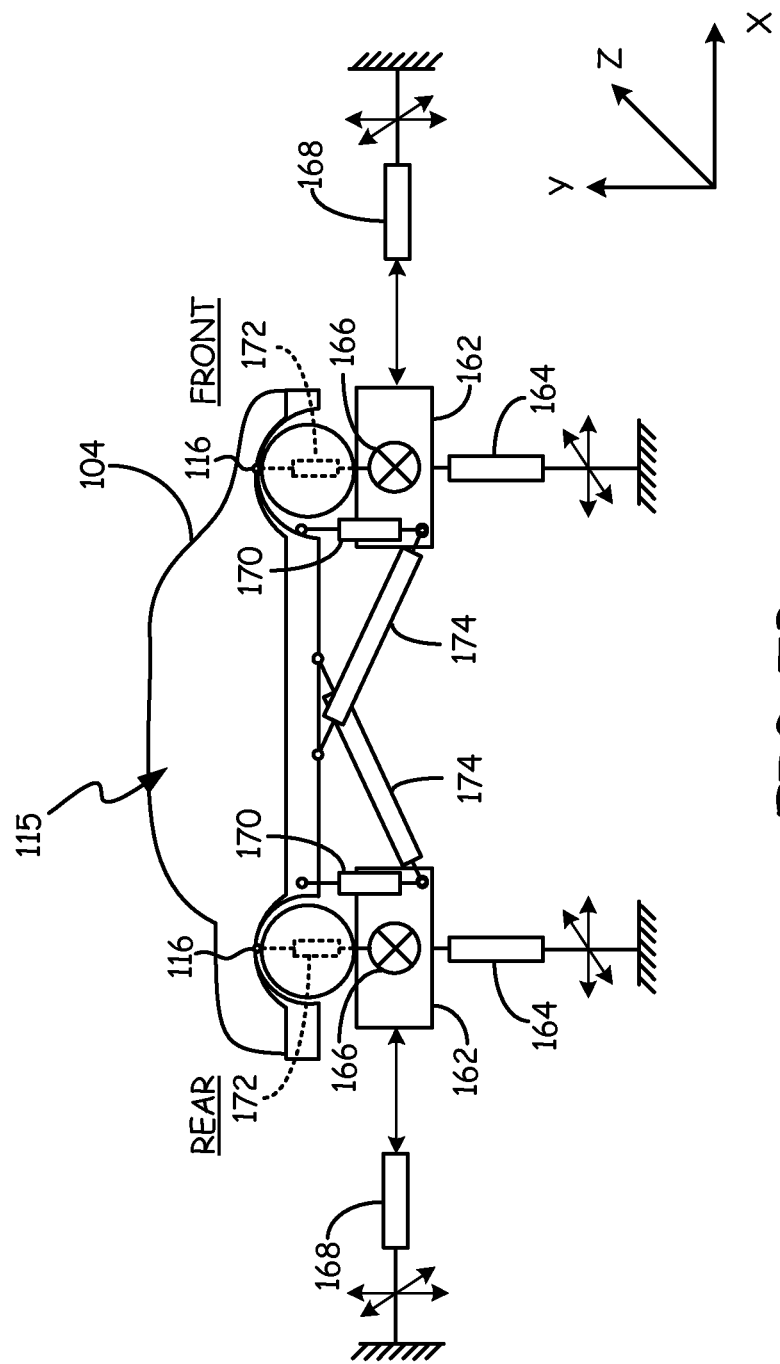

FIGS. 7A-7B illustrate an alternate embodiment of a test rig configured to provide road input forces and input forces to the body of the vehicle 115 as previously described. As shown, the test rig includes a plurality of road input supports or platform 162 as previously described in FIGS. 6A-6B. Road actuators are coupled to the road input supports or platform 162 to apply road inputs to the vehicle 115 as described above. Similar to FIGS. 6A-6B, the road input assembly 120 includes a plurality of vertical actuators 164 which can be movably coupled to the ground at one end and the road input supports or platforms 162 at another end to provide a load input $F_z$ and roll $M_x$ or pitch $M_y$ input. The road input assembly 120 also include a plurality of traverse actuators 166 having one end movably coupled to the road supports or platforms 162 and another end held stationary or movably coupled to a fixed structure or platform to provide load input $F_y$ laterally or yaw $M_z$ input and longitudinal actuators 168 connected to the tire supports or platforms 162 and frame to provide a load input $F_x$ along the x or longitudinal axis. As previously described, each of the actuators 164, 166, 168 can be movably coupled to the tire supports or platforms 162 and frame to accommodate motion in six degrees of freedom.

In the embodiment illustrated in FIGS. 7A-7B, the body actuator assembly 110 includes actuators connected in series with the road input actuators to apply input force to the body 104 of the vehicle 115 through the road input support or platform 162. As shown, the actuator assembly 110 include a plurality of vertical actuators 170 having one end coupled to the road input support or platform 162 and the other end coupled to the body 104 through a body attachment or support to input force $F_z$ and roll $M_x$ or pitch $M_y$ input to the body 104. The actuator assembly 110 also include a plurality of traverse actuators 172 having one end connected to the road supports or platforms 162 and another end connected to body 104 to provide load input Fy or yaw $M_z$ input relative to the y-axis and longitudinal actuators 174 connected to the body 104 and road supports or platforms 162 and arranged to provide a load input $F_x$ along the x axis. The actuators 170, 172, 174 of the actuator assembly 110 are movably or rotationally coupled to the road supports or platforms 162 and body to accommodate for motion of the road supports or platforms 162 and body with respect to six degrees of freedom as is known in the art. In the embodiment shown, actuators 174 are inclined and thus provide an input force component in both the x and z directions and actuators 172 are inclined (not shown) similar to actuators 174 to provide input force components in both the y and z direction.

FIGS. 8A-8B alternate embodiment of a test rig configured to provide road input forces and input forces to the body of the vehicle as previously described. As shown, the test rig includes a road input supports or platforms 162 to supply the road input to the tires, or wheel hubs as previously described (e.g. left rear tire support 162 shown with actuators in FIG. 8A). As previously described with respect to FIGS. 6A-6B and 7A-7B, each of the road input supports or platforms 162 includes an associated vertical, traverse and longitudinal actuators 164, 166 and 168 to provide load input relative to 6 DOF. In the illustrate embodiment, the actuator assembly 110 configured to apply load input to the body 104 comprises a plurality of actuators 180 arranged to form a hexapod to input forces in six degrees of freedom 6 DOF. In the illustrated embodiment shown, the hexapod inputs forces to the body through a body support or platform 182. For testing, the vehicle body 104 is supported or attached to the body support or platform 182 and the force input is supplied to body 104 through platform 182 in parallel with the road input similar to the embodiment illustrated in FIGS. 6A-6B. As shown in FIG. 8B, the platform 182 includes a plurality of load cells 184 that define the force measurement sensors 112 to measure the load applied by the plurality of actuators 180.

Figure 9D:
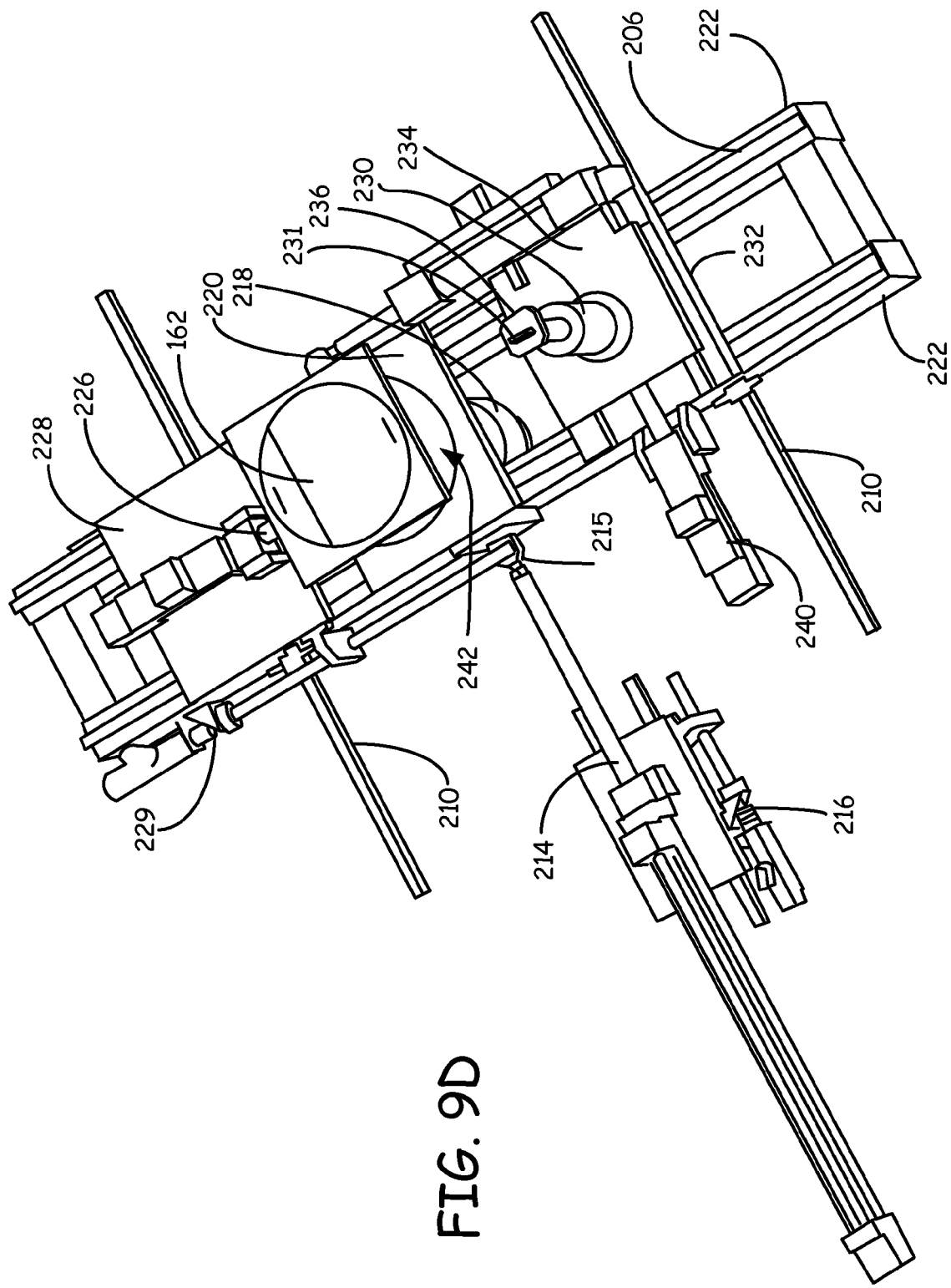

FIGS. 9A-9E illustrated an embodiment of a test rig 200 configured to implement test phases one 105 and two 109 as previously described. As shown in FIG. 9A, the rig 200 includes a frame 202 that support a plurality of test blocks 204 including body input and road input actuator components. In the embodiment, the test blocks 204 include two front test blocks 204 and two rear test blocks (not visible in FIG. 9A) to provide load input to front and rear tires or wheel hubs and four input locations on the body. As illustrated in FIGS. 9B-9C, each of the test blocks 204 include a base platform 206 and an elevated test platform 208 above the base platform 206. As shown, the base platform 206 is movable along a track formed via traverse rails 210 coupled to the frame 202. The base platform 206 moves along the track through operation of a linear actuator 214 to input lateral force $F_y$ along the y-axis to the base platform 206. Actuator 214 is fixed to frame and connected to the base platform 206 through connector 215. A positioner 216 is coupled to actuator 214 to adjust a static position of the base platform 206 prior to dynamic testing. Illustratively, an electric screw type linear actuator can be used for static positioning.

As shown more clearly in FIG. 9D, the rig 200 includes a vertical road input actuator 218 coupled to the base platform 206 through stage 220. Stage 220 is movable along rails 222 of the base platform 206. As shown a linear actuator 226 is coupled to the base platform 206 through stage 228 to impart longitudinal force $F_x$ along the x-axis to the road input support or platform 162 (which as shown is a tire patch) coupled to the vertical road actuator 218 through movement of stage 220. The static position of stage 228 is adjusted via operation of a longitudinal positioner 229 to adjust the longitudinal position of the stage 226 and the road input support or platform 162 prior to dynamic testing. Thus, as described, linear actuators 214 and 226 and vertical actuator 218 cumulatively impart road input forces or motion $F_x$ $F_y$ $F_z$ to the tire or wheel hub supported on the road input support or platform 162 for test operations Operation of actuator 214, 218, 228 can be coordinated for each test block 204 to apply yaw, pitch, and roll $M_x$ $M_y$ $M_z$ to the tire or wheel hub through the road input support or platform 162.

As shown in FIG. 9D, the body actuator assembly 110 includes a vertical body actuator 230 to supply input force $F_z$ to the body. The vertical actuator 230 is coupled to the base platform 206 through a first stage 232 coupled to and movable along rails 222 of the base platform 206 and second stage 234 movable coupled to the first stage 232 (along rails on stage 232—not visible). As shown, a stem of the vertical body actuator 230 includes attachment 231 to connect the vertical actuator 230 to the body 104. Illustratively the attachment 231 can include a clamp or pin or other device that connects to a cooperating attachment device on the body (104). The stem or rod of the actuator 230 includes a load cell 235 and a spherical joint (not visible) to allow for relative movement of the body of the vehicle and the attachment 231 and the actuator 230.

Figure 9E:
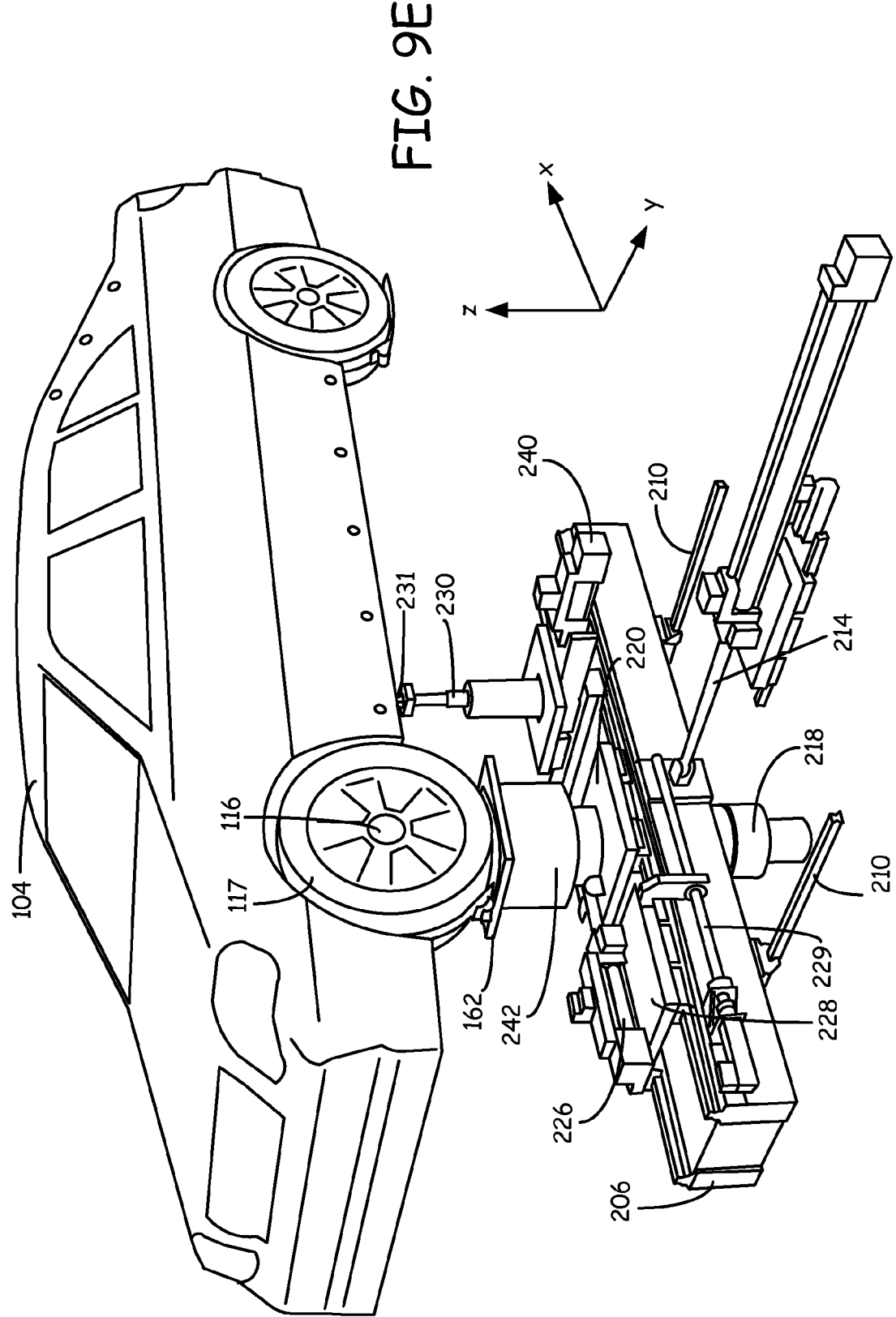

Stage 232 is movable along rails 222 of the base platform 206 via operation of linear actuator 236 coupled to stage 220 and stage 232. Thus, the vertical actuator 230 is coupled to and supported by stage 234. The vertical actuator 230 and attachment device 231 are actuated in the longitudinal direction along the x-axis in cooperation with linear actuator 226 and actuator 236 between stage 220 and stage 232. The second stage 234 is actuated laterally along the y-axis relative to stage 232 via actuator 240. Thus, as shown, vertical actuator 230 is moved laterally in cooperation with base platform 206 and stage 234 via linear actuators 214 and 240 and longitudinally via operation of actuators 226 and 236. Thus, as described, input force is applied to the body 104 by actuators 236 and 240 in combination with 214, 226 that supply road input force or motion to the road input support or platform 162 as shown in FIG. 9E.

Illustratively, linear actuators 214, 226, 236 and 240 are hydraulic actuators although application is not limited to a hydraulic actuator and other actuators, such as an electric actuator could be used. As previously shown in FIGS. 9A-9C, the actuator components are covered to limit effects of wind and turbulence on the measurement components. As shown in FIGS. 9B-9C, the test platform includes cover 250 to limit the effects of turbulence. Cover 250 includes openings for the road input support or platform 162 and body attachment 231 attached to a stem of the vertical body actuator 230. The cover 250 includes a roller portions that allow the longitudinal position of the openings for the road input support or platform 162 and body attachment 231 to adjust to compensate for longitudinal movement of the road input support or platform 162 and body attachment 231 during operation and movement imparted via actuator 226. Additionally, as shown, the opening for the body attachment 231 or stem of vertical actuator 230 is covered by an eccentric ring assembly 253. The eccentric ring assembly 253 includes nested plates to provide a laterally and longitudinally adjustable opening for the body attachment 231 and stem. The static position of the opening of the ring assembly 253 is adjusted to compensate for static adjustments prior to dynamic test operations. Additionally, as shown in FIG. 9A, the rig 200 includes a laterally adjustable roller cover 254. As shown, cover 254 is supported along guides of guide support 256 to compensate for lateral movement of the base platform 206 relative to frame 202.

Load cells or other measurement devices are used in the load path of the road input actuator and body input actuators to measure force or motion. As shown in FIG. 9E, a thermal shield 242 is provided about a load cell (not shown) in the load path of the vertical actuator 218 to limit influence of external forces, such as drag and bending moments on the measurement. The shield 242 also protects from cooling effects of the wind, which can influence measurement accuracy. As previously described, operation of actuators 214, 218, 226, 230, 236 and 240 can be coordinated to provide yaw, pitch and roll input to the body. Although various test rigs are disclosed for implementing the test procedure, application is not limited to the specific embodiments shown and alternate structures can be used such as down force actuator rigs or flatrack roadway systems as will be appreciated by those skilled in the art.

Figure 10A:
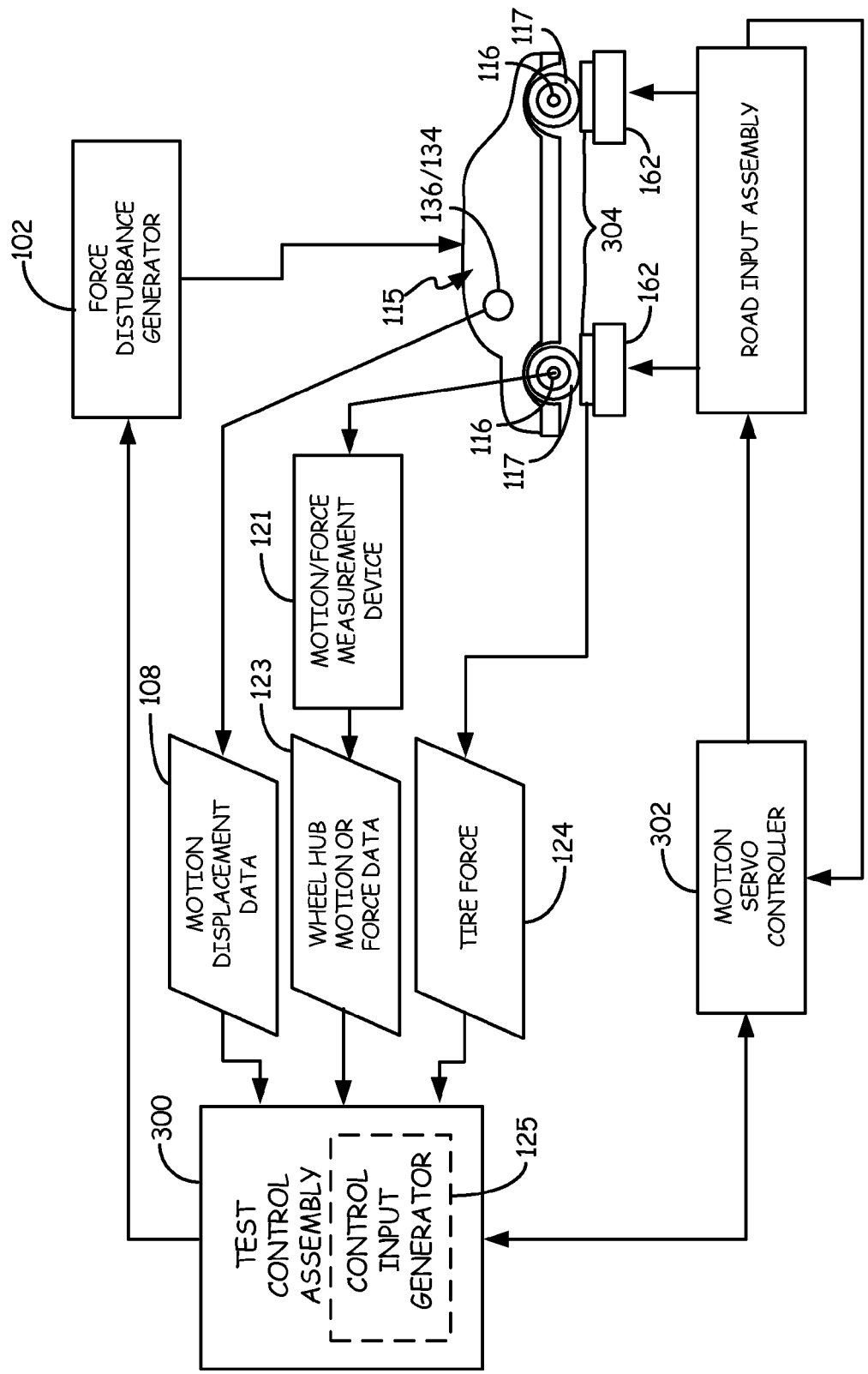
FIGS. 10A-10C schematically illustrates a test system and control components for implementing different phases of the test procedure.
Figure 10B:
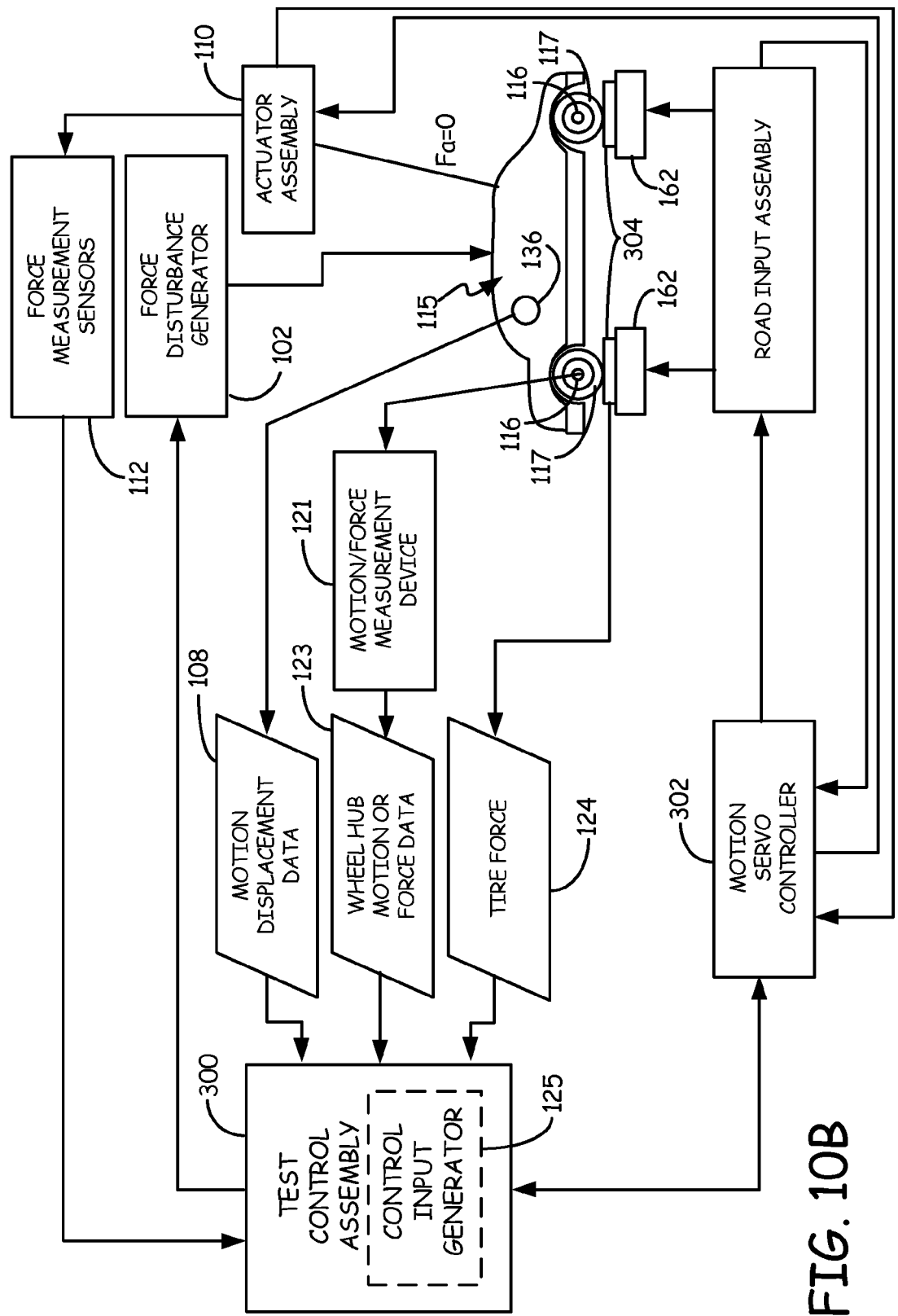
Figure 10C:
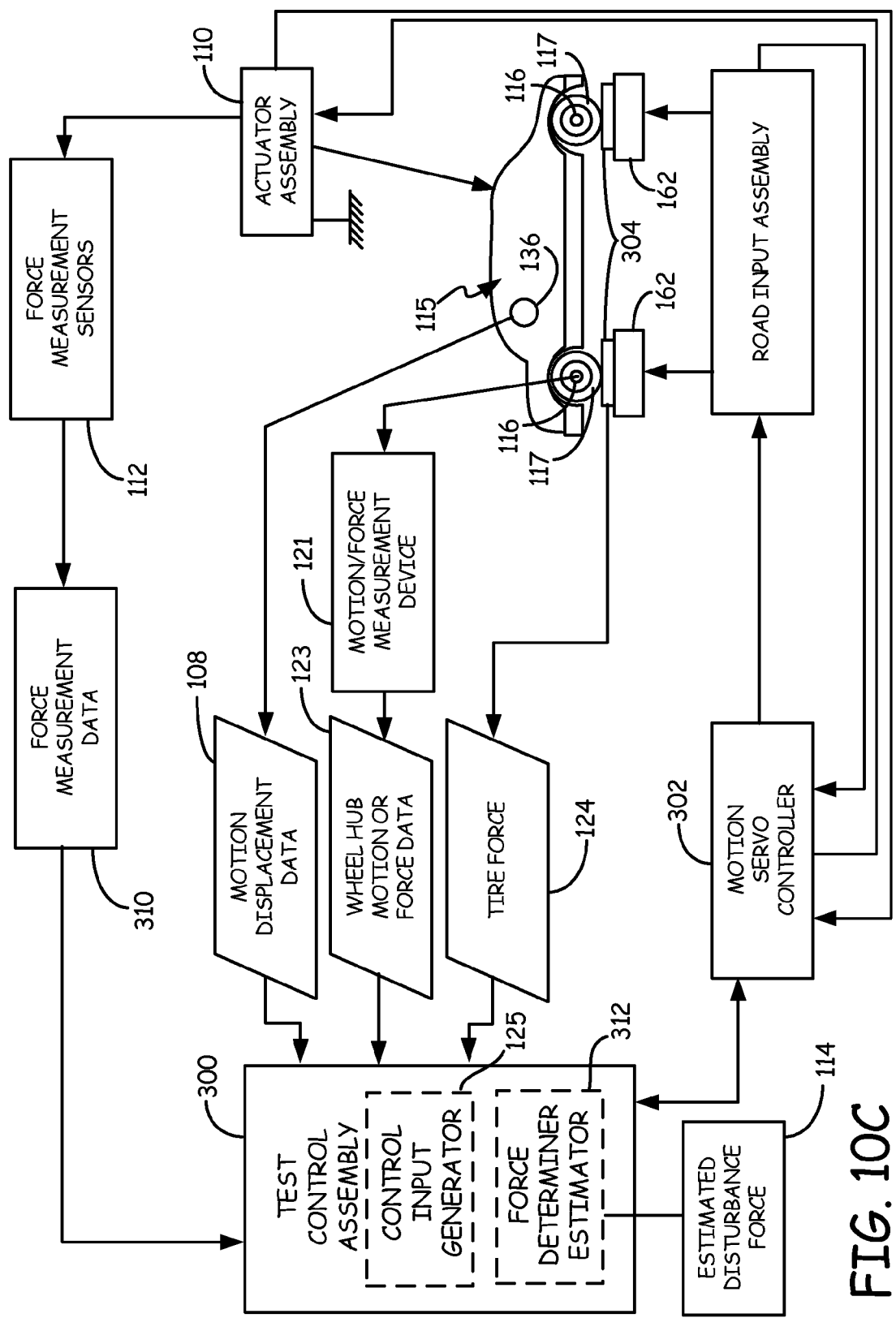

FIGS. 10A-10C illustrate operation control of the test system generally illustrated in FIG. 2. FIGS. 10A-10B illustrate operation control for phase one 105 and FIG. 10C illustrates operation control for phase two 109. As shown in FIG. 10A, the system includes a test control assembly 300, which provides drive inputs to a servo/motion controller 302 coupled to the road input assembly 120. As illustrated, the servo controller 302 provides input commands to road input assembly 120 to energize one or more actuators coupled to the road input supports or platforms 162 as previously described. The servo controller 302 utilizes feedback from the assembly 120 to provide closed loop or real time control. The force disturbance generator 102 is also coupled to the test control assembly 300 to turn on/off the wind source 132 for example.

During phase one 105 of the test procedure the wind source 132 is turned on and the velocity of the wind is set to simulate the motion of the wind in tandem with application of the road input via the road input assembly 120. The drive commands for the road input assembly 120 can provide repeatable input forces and/or motion to simulate turning, a slalom event or other motion. Alternatively, test control assembly 300 can generate drive commands to replicate or simulate actual road conditions using RPC® software and equipment available from MTS Systems Corp of Eden Prairie, Minn. As shown, the test control assembly 300 receives input from motion or displacement sensors 106, input tire force 124 from load cells 304 and wheel hub motion or force data 123, which is used by the control input generator 125 to generate drive commands for the actuator assembly 110 for the second phase 109 of the test.

As previously described with respect to FIG. 5, in the embodiment illustrated in FIG. 10B, during phase one 105, actuators of the actuator assembly 110 are connected to the body 104 and are controlled to apply zero load to the body using feedback from the force measurement sensors 112. Illustratively the force measurement sensors 112 include a load cell or transducer or alternatively the sensor can measure force using a pressure differential between chambers of a pneumatic or hydraulic actuator as is known by those skilled in art.

During the phase two 109 as shown in FIG. 10C, the wind source 132 is turned off or removed and the test control assembly 300 provides the control parameters 126 to the servo controller 302 to operation the actuator assembly 110 to replicate the motion applied by the wind as measured by the motion displacement data 108 and the motion or force data 123 measured by the motion or force measurement device 121 and/or tire force 124 measured by load cells 304. In particular, a portion of force in phase one 105 may be transmitted directly from the body through the suspension and the tires 117. Thus, by using the tire force 124 measured by the load cell 304, the system can more accurately control the actuator assembly 110 to replicate the forces introduced by the force disturbance generator 102 during phase one 105 of the test, since the control assembly knows the measure of the disturbance force reacted through the suspension and the tires 117.

As shown during phase two 109, the test control assembly 300 receives force measurement data 114 corresponding to the applied force imparted to the body 104 via the actuator assembly 110. As shown, a force determiner or estimator 312 uses the applied load to the body to provide a measure of the disturbance force 114 applied by the force disturbance generator 102. As previously described, the force is measured via a load cell (for example a multi-axial load cell) or determined using a pressure differential of the actuator or other force measurement device. The applied force is measured at each body input or attachment in 3 DOF and the plurality of body inputs are used to measure force in 6 DOF including $F_x$, $F_y$, $F_z$ and $M_x$, $M_y$, $M_z$.

Figure 11:
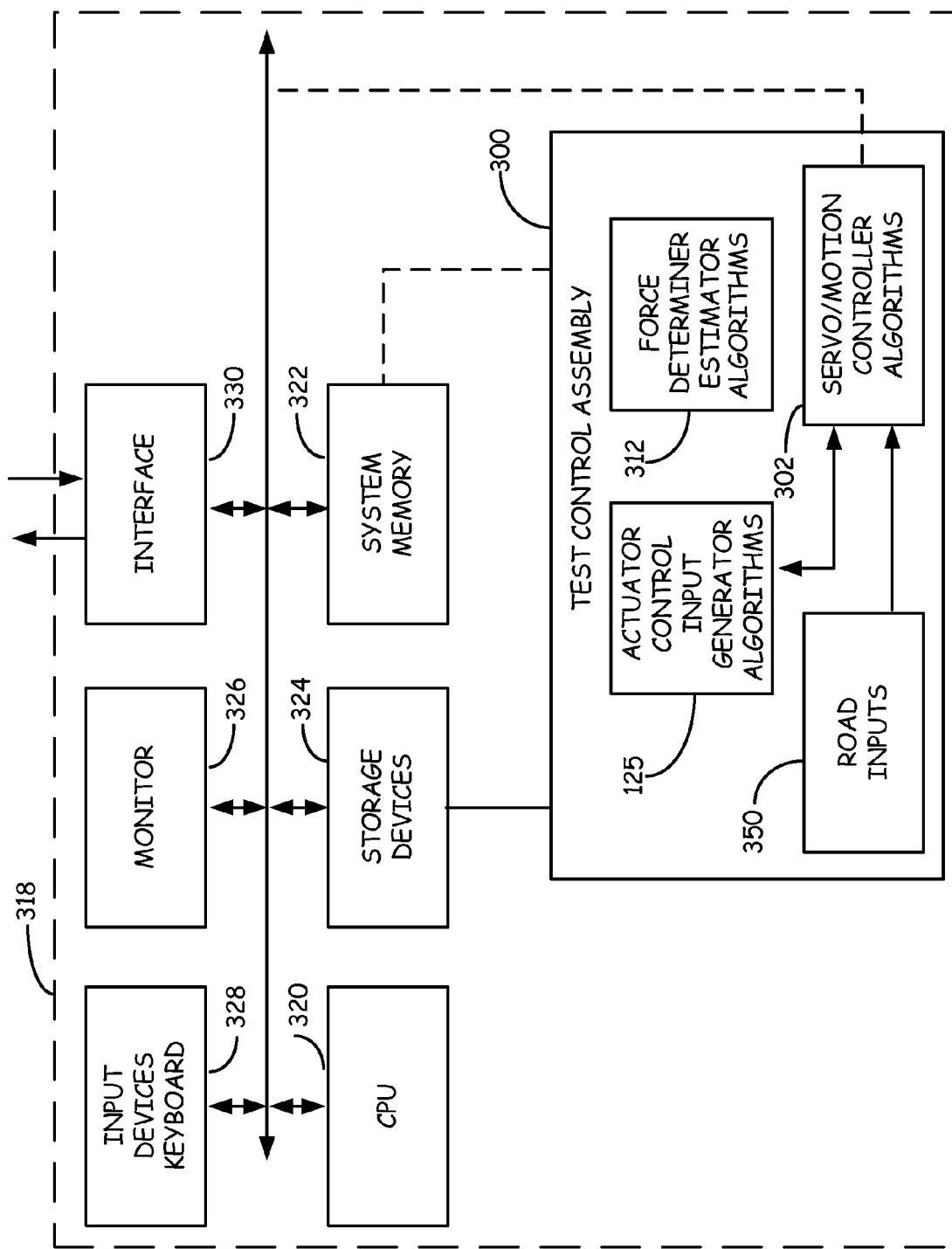
FIG. 11 schematically illustrates an embodiment of a computer assembly for implementing control components of the test systems described.

The test control assembly 300 and servo control functions illustrated in FIGS. 10A-10C can be implemented in a computer device 318 as illustrated in FIG. 11. As shown, the computer device includes a central processing unit (CPU) 320, memory 322, data storage devices 324, display monitor 326, one or more input devices 328 and input/output interface 330 to receive input data and output control commands. The data storage devices 324 include, but are not limited to, rotating discs or solid state memory devices configured to storage program instructions executable by the CPU 320 and/or data.

The input/output interface 330 outputs control commands to operate the road input assembly 120, actuator assembly 110 and force disturbance generator 102 and receives the motion/displacement data 108, force data 114 and tire force 121 and/or wheel hub motion data 123 as previously described. Although a single input/output interface is shown, multiple input/output channels can be used. The control input generator 125, force determiner or estimator 312, road input models or drive commands 350 and servo controller 302 algorithms of the test control assembly 300 can be implemented via instructions or code stored in memory 322, 324 or other storage devices. Alternatively, the control functions can be implemented by separate controller component, circuitry or devices which interfaces with component of the computer 318 through bus 332 or through I/O interface 330 via a wired or wireless connection.

Although the present invention has been described with reference to preferred embodiments for a vehicle test system, workers skilled in the art will recognize that changes may be made in form and detail without departing from the spirit and scope of the invention. Application of the test assembly disclosed herein is not limited to a vehicle test specimen as described and embodiments can be used to measure disturbance forces for other test specimens.

What is claimed is:

1. A method comprising:
   applying an input force disturbance to a body;
   measuring motion or displacement of the body in response to the input force disturbance;
   with the force disturbance removed, applying an input load to the body to replicate the measured motion or displacement imparted to the body via the input force disturbance; and
   measuring the input load applied.

2. The method of claim 1 and comprising:
   utilizing the measured motion displacement of the body to generate control parameters;
   utilizing the control parameters to operate one or more actuators to apply the input load to the body to replicate the measured motion or displacement.

3. The method of claim 1 wherein the body is coupled to a tire or wheel hub and comprising:
   applying a road input force or displacement to the tire or wheel hub while applying the input force disturbance;
   measuring the road input force or displacement;
   utilizing the measure motion or displacement of the body and the measured road input force or displacement to generate control parameters to operate one or more actuators to apply the input load to the body; and
   utilizing the control parameters to operate the one or more actuators to apply the load input to the body.

4. The method of claim 3 wherein the step of applying the road input force or displacement comprises
   utilizing drive commands to operate one or more actuators coupled to a road input support or platform to simulate road conditions.

5. The method of claim 3 wherein the step of measuring the road input force or displacement comprises
   measuring one or both of the tire contact force or the wheel hub motion or force; and
   utilizing one or both of the tire contact force or the wheel hub motion or force to generate the control parameters to operate the one or more actuators to apply the input load to the body.

6. The method of claim 1 wherein the step of applying the input force disturbance comprises:
   applying wind disturbance to the body from a wind source in a wind tunnel.

7. The method of claim 1 wherein the input load is applied to the body through one or more actuators and comprising:
   measuring the applied load of the one or more actuators; and
   outputting the measure of the applied load of the one or more actuators.

8. The method of claim 2 comprising
   controlling the one or more actuators so the input load is zero while the input force disturbance is applied to the body.

9. A test assembly comprising:
   a control parameter generator configured to receive a measure of motion or displacement of a body and output control parameters for controlling one or more actuators;
   a motion controller coupled to the one or more actuators and configured to receive the control parameters to operate the one or more actuators to replicate the measured motion or displacement of the body;
   one or more force measurement sensors configured to measure an applied load of the one or more actuators; and a determiner component configured to use force measurements from the one or more force measurement sensors to ascertain and output a force profile that quantifies the forces applied to the body that measure of motion or displacement of the body.

10. The test assembly of claim 9 and comprising a road input support or platform configured to apply a load to vehicle, and a plurality of actuators including at least one actuator coupled to the road input support or platform to supply road input and at least one actuator configured to provide an input load force to the body and the control parameter generator utilizes measurements from a tire contact force sensor or wheel hub motion measurement device to generate the control parameters for the at least one actuator coupled to the body to replicate the measured motion or displacement of the body.

11. The test assembly of claim 9 and comprising a force disturbance generator to impart the input force disturbance to the body and one or more motion sensors coupled to the body to measure the motion or displacement of the body.

12. An apparatus comprising:
one or more actuators including at least one actuator coupled to a body attachment or support;
a control assembly configured to receive input measurements of motion or displacement of a body from one or more motion or displacement sensors and generate control parameters to operate the at least one actuator coupled to the body to input load to the body attachment or support to replicate the measured motion or displacement to the body;
one or more force measurement sensors configured to measure the input load applied by the at least one actuator coupled to the body attachment or support; and
and wherein the control assembly is further configured to use force measurements from the one or more force measurement sensors to ascertain and output a force profile that quantifies the forces applied to the body that caused the measurement of motion or displacement of the body.

13. The apparatus of claim 12 and comprising a force disturbance generator configured to impart the motion or displacement to the body and the one or more motion or displacement sensors to measure the motion or displacement imparted to the body in response to input force from the force disturbance generator.

14. The apparatus of claim 12 and comprising a road input support or platform configured to applying a load to vehicle, and wherein the one or more actuators includes a plurality of actuators including the at least one actuator coupled to the body attachment or support and at least one actuator coupled to the road input support or platform.

15. The apparatus of claim 12 wherein the control assembly includes a control parameter generator which utilizes input from the one or more motion or displacement sensors on the body and one or more force or motion sensors on a wheel hub or tire to generate the control parameters to operate the at least one actuator coupled to the body attachment or support.

16. The apparatus of claim 12 and comprising a fixed frame or structure and a road input support or platform configured to apply a load to vehicle, and wherein the one or more actuators includes a plurality of actuators, wherein the plurality of actuators include one or more actuators coupled to the fixed frame or structure and the road input support or platform to apply road input force or displacement to a wheel hub or tire and one or more actuators coupled to the fixed frame or structure and the body attachment or support to apply the input load to the body attachment or support in parallel with the road input force or displacement.

17. The apparatus of claim 12 and comprising a fixed frame or structure and a road input support or platform configured to apply a load to vehicle, and wherein the one or more actuators includes a plurality of actuators, wherein the plurality of actuators include one or more actuators coupled to the fixed frame or structure and the road input support or platform to apply road input force or displacement and one or more actuators coupled to the road input support or platform and the body attachment or support to apply the input load to the body attachment or support in series with the road input force or displacement.

18. The apparatus of claim 12 and comprising a base platform, a linear actuator coupled to the base platform, a second vertical actuator coupled to the body attachment or support and a road input support or platform configured to apply a load to vehicle, and wherein the one or more actuators includes a plurality of actuators including a first vertical actuator coupled to the road input support or platform and the first and second vertical actuators are coupled to the base platform movable in a first direction relative to a fixed frame or structure by the linear actuator coupled to the base platform.

19. The apparatus of claim 18 and comprising a first stage, a second stage, a third stage, a second linear actuator, wherein the linear actuator coupled to the base platform forms a first actuator and the first vertical actuator is coupled to the first stage movably coupled to the base platform in a second direction different from the first direction via operation of the second linear actuator and the second vertical actuator is coupled to the second stage movable relative to the third stage which is movably coupled to the base platform, and the apparatus further comprising a third actuator coupled to the first stage and the second stage to move the second stage relative to the first stage in the second direction and a fourth actuator coupled to the second and third stages to move the third stage in the first direction relative to the second stage.

20. The apparatus of claim 18 and further comprising a first stage, a second stage, a third stage, a second linear actuator, a third linear actuator and fourth linear actuator, wherein the linear actuator coupled to the base platform forms a first actuator and the first vertical actuator is coupled to the first stage coupled to the base platform and movable in a second direction different from the first direction via the second linear actuator and the second vertical actuator is coupled to the second stage movable in the first direction via the third linear actuator and the second stage is coupled to a third stage movable relative to the base platform in the second direction via the fourth linear actuator.

* * * * *